United States Patent
Maity et al.

(10) Patent No.: US 9,158,564 B2
(45) Date of Patent: Oct. 13, 2015

(54) VIRTUAL SERVICE PROCESSOR STACK

(75) Inventors: Sanjoy Maity, Snellville, GA (US); Samvinesh Christopher, Suwanee, GA (US); Baskar Parthiban, Johns Creek, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 814 days.

(21) Appl. No.: 13/459,746

(22) Filed: Apr. 30, 2012

(65) Prior Publication Data

US 2013/0289926 A1     Oct. 31, 2013

(51) Int. Cl.
*G06F 1/00* (2006.01)
*G06F 9/455* (2006.01)
*G06F 9/50* (2006.01)

(52) U.S. Cl.
CPC .......... *G06F 9/45533* (2013.01); *G06F 9/5077* (2013.01)

(58) Field of Classification Search
CPC .................................................. G06F 9/45533

USPC ............................................................ 702/130
See application file for complete search history.

(56) References Cited

U.S. PATENT DOCUMENTS 8,209,686 B2 *   6/2012   Diaz et al. ........................ 718/1
2013/0238785 A1 *   9/2013   Hawk et al. .................... 709/224

* cited by examiner

*Primary Examiner* — Elias Desta
(74) *Attorney, Agent, or Firm* — Locke Lord LLP; Tim Tingkang Xia, Esq.

(57) ABSTRACT

Certain aspects of the present disclosure are directed to a computer system, including: a hypervisor configured to run on a CPU and to provide a first domain; and a virtual baseboard management controller (BMC) stack configured to run in the first domain or as part of the hypervisor. Certain aspects of the present disclosure are directed to a non-transitory computer readable medium that stores instructions executable by at least one processor, the instructions including loading a virtual baseboard management controller (BMC) stack in a first domain of, or as a part of, a hypervisor running on the processor.

42 Claims, 4 Drawing Sheets

VIRTUAL SERVICE PROCESSOR STACK

FIELD

The present disclosure is in the field of service processors, especially Baseboard Management Controllers (BMC).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Generally, the term "computer system" refers to either a stand-alone system or a plurality of interconnected systems, such as, for instance, a client-server network. Regardless of the implementation, the various components making up a computer system typically operate within a range of parameters defined by performance protocols or standards. For instance, the temperature within a computer chassis is often monitored in order to detect periods in time when the system may rise above a certain predetermined temperature reading. Other forms of information that may be monitored within a computer system include, without limitation, voltages associated with semiconductor components located on the baseboard of the system, velocity (e.g., rpm) of cooling fans located on the baseboard or within the system chassis, and the velocity of spindle motors within hard disk drives or optical drives.

Various types of sensors are being used to detect health, operating and performance-related parameters associated with a computer system and its constituent components. Referring to the examples provided above, these sensors include thermostats, voltage meters and tachometers. A computer system typically employs one or more management modules to assist in the collection and analysis of information sensed by the various sensors measuring operating and performance-related parameters within the system. These management modules may be either software or hardware components, but typically encompass both hardware and software components such as implemented by service processors. One such management module is referred to as a "Baseboard Management Controller" (BMC). The BMC is a microcontroller integrated into the baseboard (also known in the industry as the "motherboard") of a computer system and having a specified number of contact pins through which information sensed by various sensors is received for analysis by the BMC. In order to perform this analysis, the BMC is programmed with firmware for implementing procedures relating to system monitoring and recovery. With this firmware, the BMC is programmed to monitor various operating and performance-related parameters sensed within a computer system and to analyze this information to determine whether any of the sensed parameters are currently outside of an expected or recommended operating range, the occurrence of which is commonly referred to as an "event."

As technologies advance, computer systems become increasingly small and dense. The physical space in a computer system, such as a blade server, for a physical BMC may not be available. Further, in order to reduce the cost of a computer system, a physical BMC may be eliminated from the computer system. The needs for monitoring health, operating and performance-related parameters of the computer system, however, still exist.

SUMMARY

Certain aspects of the present disclosure are directed to a computer system, including: a hypervisor configured to run on a CPU and to provide a first domain; and a virtual baseboard management controller (BMC) stack configured to run in the first domain.

In certain embodiments, the virtual BMC stack is configured to receive a first parameter relating to operation or performance or health of the computer system and measured by a first sensor. In certain embodiments, the first parameter is transmitted to the virtual BMC stack through a system bus of the computer system. In certain embodiments, the first parameter is a CPU temperature and is measured by a CPU temperature sensor.

In certain embodiments, the hypervisor is further configured to provide a second domain, and an operating system of the computer system is configured to run in the second domain. In certain embodiments, the virtual BMC stack of the first domain is isolated from the operating system of the second domain. In certain embodiments, the first domain is a privileged domain and includes a first network interface assigned a first MAC address, the first MAC address functions as the MAC address of the hypervisor, and the virtual BMC stack is in communication with the first network interface and receives packets addressed to the first MAC address. In certain embodiments, the first domain further includes a TCP/IP stack, the first network interface is assigned a first IP address, the first IP address functions as the IP address of the hypervisor, and the virtual BMC stack responds to IPMI commands addressed to the first IP address. In certain embodiments, the first domain is a privileged domain, the hypervisor is configured to provide a virtualized video controller, and the virtual BMC stack redirects video graphics output of the operating system rendered by the virtualized video controller to a remote client computer.

In certain embodiments, the first domain is an unprivileged domain and has a first network interface, the first network interface writes a first packet received from the virtual BMC stack and addressed to a remote computer in a shared memory segment of the hypervisor, and the first network interface reads a second packet in the shared memory segment and addressed to the virtual BMC stack as well as sends the second packet to the virtual BMC stack. In certain embodiments, the hypervisor includes a second domain that is a privileged domain, the second domain has a second network interface, and the second network interface reads the first packet written in the shared memory segment by the first network interface and forwards the first packet en route to the remote computer.

In certain embodiments, the computer system further includes a BMC component chip in communication through a management bus with a plurality of sensors each sensing a parameter relating to operation or performance or health of the computer system, and the BMC component chip transmits a plurality of sensed parameters to the virtual BMC stack through a system bus. In certain embodiments, the BMC component chip is not a full-fledged service processor and does not independently provide substantial baseboard management functions. In certain embodiments, the BMC component chip is in communication with a first temperature sensor and a second temperature sensor through a management bus, the first temperature sensor measures a first temperature in a first thermal zone of the computer system, the second temperature sensor measures a second temperature in a second thermal zone of the computer system, and the BMC component chip collects the first and second temperatures and forwards the first and second temperatures to the virtual BMC stack. In certain embodiments, the BMC component chip has firmware that processes the parameters received from the plurality of sensors and sends the processed results to the virtual BMC stack.

In certain embodiments, the virtual BMC stack has a management host application, the computer system further includes a remote client computer configured to run a management client application, and the management host application and the management client application are configured to communicate out-of-band.

Certain aspects of the present disclosure are directed to computer system, including: a hypervisor configured to run on a CPU; and a virtual baseboard management controller (BMC) stack configured to run as a part of the hypervisor.

In certain embodiments, the virtual BMC stack is configured to receive a first parameter relating to operation or performance or health of the computer system and measured by a first sensor. In certain embodiments, the first parameter is transmitted to the CPU through a system bus of the computer system. In certain embodiments, the first parameter is a CPU temperature and is measured by a CPU temperature sensor.

In certain embodiments, the hypervisor is further configured to provide a first domain, and an operating system of the computer system is configured to run in the first domain. In certain embodiments, the hypervisor includes a first network interface assigned a first MAC address, and the virtual BMC stack is in communication with the first network interface and receives packets addressed to the first MAC address. In certain embodiments, the hypervisor further includes a TCP/IP stack, the first network interface is assigned a first IP address, and the virtual BMC stack responds to IPMI command addressed to the first address.

In certain embodiments, the computer system further includes a BMC component chip in communication through a management bus with a plurality of sensors each sensing a parameter relating to operation or performance or health of the computer system, and the BMC component chip transmits a plurality of sensed parameters to the virtual BMC stack through a system bus. In certain embodiments, the BMC component chip is not a full-fledged service processor and does not independently provide substantial baseboard management functions. In certain embodiments, the BMC component chip is in communication with a first temperature sensor and a second temperature sensor through a management bus, the first temperature sensor measures a first temperature in a first thermal zone of the computer system, the second temperature sensor measures a second temperature in a second thermal zone of the computer system, and the BMC component chip collects the first and second temperatures and forwards the first and second temperatures to the virtual BMC stack. In certain embodiments, the BMC component chip has firmware that processes the parameters received from the plurality of sensors and sends the processed results to the virtual BMC stack.

Certain aspects of the present disclosure are directed to a non-transitory computer readable medium that stores instructions executable by at least one processor, the instructions including: loading a virtual baseboard management controller (BMC) stack in a first domain of, or as a part of, a hypervisor running on the processor.

In certain embodiments, the instructions include: executing the virtual BMC stack to receive a first parameter relating to operation or performance or health of the computer system and measured by a first sensor. In certain embodiments, the first parameter is transmitted to the virtual BMC stack through a system bus of the computer system. In certain embodiments, in the first parameter is a CPU temperature and is measured by a CPU temperature sensor.

In certain embodiments, the instructions include loading an operating system in a second domain of the hypervisor, and the virtual BMC stack is loaded in the first domain. In certain embodiments, the virtual BMC stack of the first domain is isolated from the operating system of the second domain. In certain embodiments, the first domain is a privileged domain and includes a first network interface assigned a first MAC address, the first MAC address functions as the MAC address of the hypervisor, and the instructions include executing the virtual BMC stack to communication with the first network interface and to receive packets addressed to the first MAC address. In certain embodiments, the first domain further includes a TCP/IP stack, the first network interface is assigned a first IP address, the first IP address functions as the IP address of the hypervisor, and the instructions include executing the virtual BMC stack to respond to IPMI commands addressed to the first IP address. In certain embodiments, the first domain is a privileged domain, the hypervisor is configured to provide a virtualized video controller, and the instructions include executing the virtual BMC stack to redirect video graphics output of the operating system rendered by the virtualized video controller to a remote client computer.

In certain embodiments, the virtual BMC stack is loaded in the first domain, the first domain is an unprivileged domain and has a first network interface, the first network interface writes a first packet received from the virtual BMC stack and addressed to a remote computer in a shared memory segment of the hypervisor, and the first network interface reads a second packet in the shared memory segment and addressed to the virtual BMC stack as well as sends the second packet to the virtual BMC stack. In certain embodiments, the hypervisor includes a second domain that is a privileged domain, the second domain has a second network interface, and the second network interface reads the first packet written in the shared memory segment by the first network interface and forwards the first packet en route to the remote computer.

In certain embodiments, the instructions include executing the virtual BMC stack to receive a plurality of sensed parameters from a BMC component chip through a system bus, and the BMC component chip is in communication through a management bus with a plurality of sensors each sensing a parameter relating to operation or performance or health of the computer system. In certain embodiments, the BMC component chip is not a full-fledged service processor and does not independently provide substantial baseboard management functions. In certain embodiments, the BMC component chip is in communication with a first temperature sensor and a second temperature sensor through a management bus, the first temperature sensor measures a first temperature in a first thermal zone of the computer system, the second temperature sensor measures a second temperature in a second thermal zone of the computer system, the BMC component chip collects the first and second temperatures, and the instructions include executing the virtual BMC stack to receive the first and second temperatures. In certain embodiments, the BMC component chip has firmware that processes the parameters received from the plurality of sensors, and the instructions include executing the virtual BMC stack to receive the processed results.

In certain embodiments, the virtual BMC stack has a management host application, and the instructions include executing the management host application to communicate, out-of-band, with a management client application on a remote client computer.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
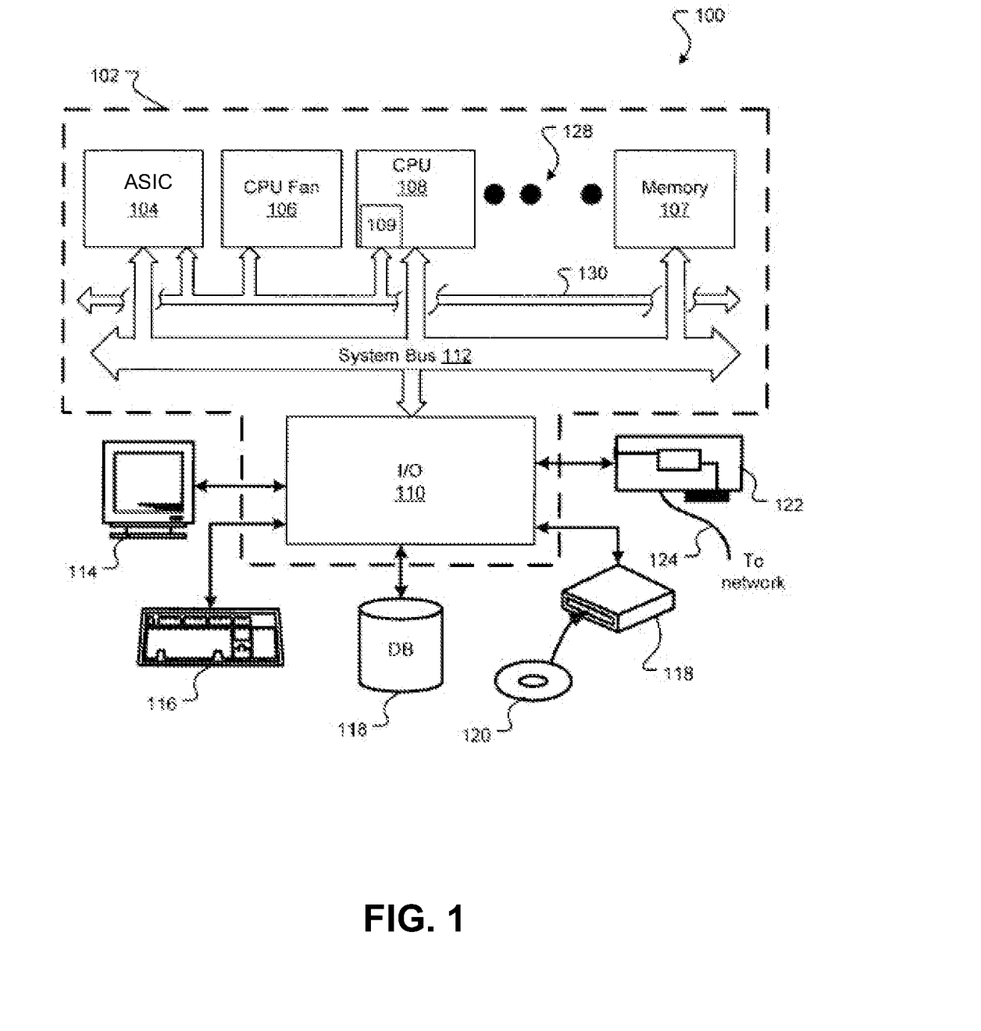
FIG. 1 schematically depicts a computer system in accordance with certain embodiments of the present disclosure.

Referring to FIG. 1, a conceptual illustration of an environment associated with the present disclosure is shown in accordance with certain embodiments of disclosure. FIG. 1 shows a computer system 100, and more specifically a stand-alone, general purpose computer system. One skilled in the art would appreciate that the computer systems 100 discussed throughout the present disclosure can be of various types, such as desktop computers, laptop computers, tablet computers, hand-held computers, server computers, blade servers, industrial computers, appliances controllers, electronics equipment controllers, etc. The computer system 100 can be a special purpose computer system or a system that incorporates more than one interconnected system, such as a client-server network. Indeed, the computer system 100 of FIG. 1 only represents an exemplary embodiment of the present disclosure, and therefore, should not be considered to limit the disclosure in any manner.

The central intelligence of the computer system 100 is a baseboard 102, or motherboard, which is a printed circuit board to which a multitude of components or devices may be connected by way of a system bus 112 or other electrical communication path (not shown). In an embodiment, these components include, without limitation, a virtual BMC component chip 104, a central processing unit (CPU) 108, memory 107 and an Input/Output module 110. It is also contemplated that the system bus 112 may include other components that are not explicitly shown in FIG. 1. As such, repetition dots 128 illustrate the possible connection of these other components to the system bus 112. The layout of components, and the manner in which the components are interconnected, on the baseboard 102 is herein referred to as the "configuration" of the baseboard 102.

The system bus 112 provides a two-way communication path for all components connected to the system bus 112. The component that initiates a communication on a bus is referred to as a master component and the component to which the initial communication is sent on the bus is referred to as a slave component. A master component therefore issues an initial command to or initially requests information from a slave component. Each slave component is addressed, and thus communicatively accessible to master components, by a particular slave address. Both master components and slave components are operable to transmit and receive communications over the system bus 112. Buses and the associated functionality of master-slave communications are well-known to those skilled in the art, and therefore not discussed in further detail herein.

Figure 3:
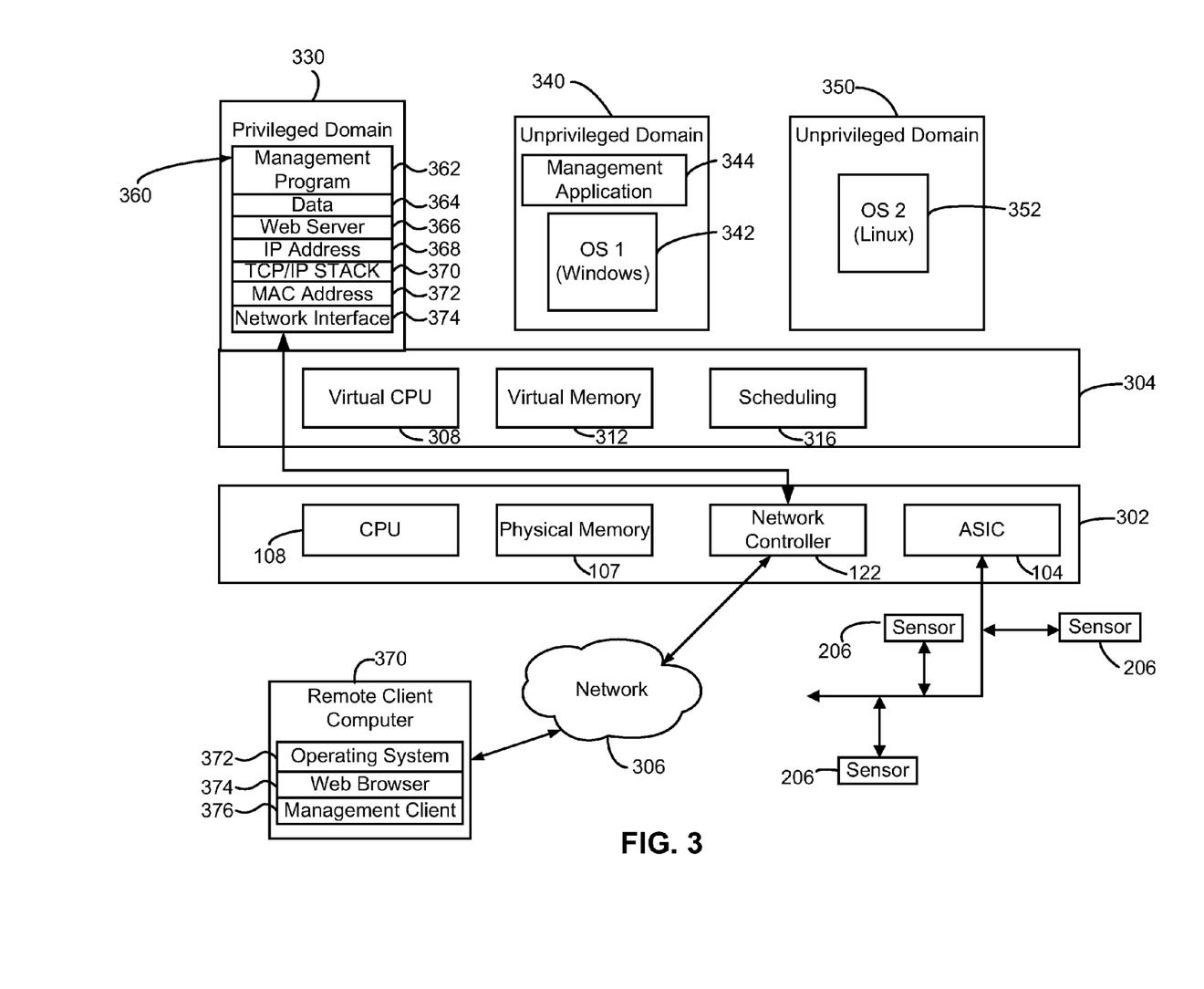
FIG. 3 schematically depicts a virtual BMC in a first configuration in accordance with certain embodiments of the present disclosure.
Figure 4:
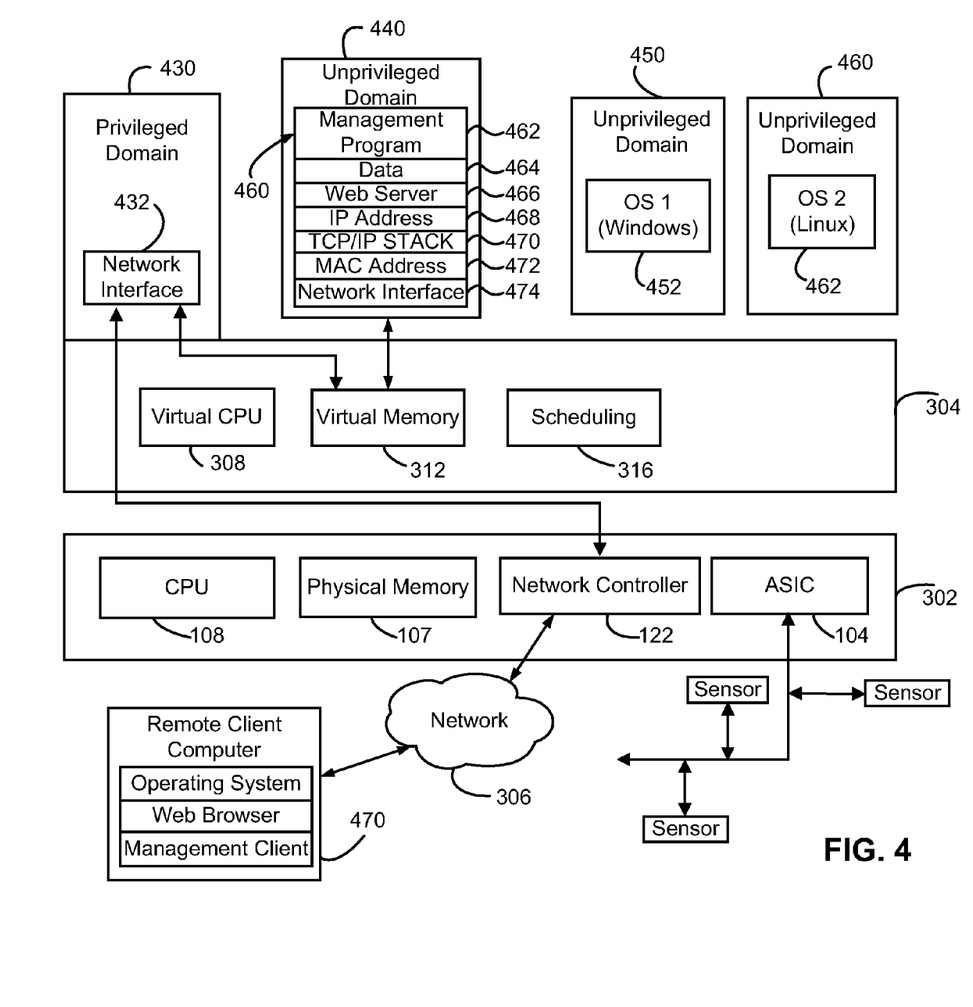
FIG. 4 schematically depicts a virtual BMC in a second configuration in accordance with certain embodiments of the present disclosure.

Referring to FIGS. 1 and 3-4, the CPU 108 is a standard central processor that performs arithmetic and logical operations necessary for the operation of the computer system 100. CPUs are well-known in the art, and therefore not described in further detail herein. Like many electrical components, the CPU 108 dissipates heat while operating. As such, a CPU fan 106 is used to cool off the CPU 108 after the CPU 108 reaches a prescribed temperature. Such a determination, i.e., whether the CPU 108 exceeds a prescribed temperature, is made by a virtual BMC implemented by utilizing a hypervisor 304. A hypervisor 304, also called virtual machine manager (VMM), is typically one of many hardware virtualization techniques allowing multiple operating systems, termed guests, to run concurrently on a host computer. The virtual BMC include a virtual BMC stack 360 that includes various applications and software for, among other things, implementing baseboard management functions. The computer system 100 does not have a conventional physical system-on-chip BMC. In certain embodiments, from a remote computer's perspective, the virtual BMC 360 functions like a physical system-on-a-chip BMC.

Virtualization allows the virtual BMC stack 360 and an operating system 342, 352 to be consolidated to on a single CPU 108, without losing the security gained by having completely isolated environments. Virtualization makes it relatively easy to migrate a virtual BMC stack 360 from one physical computer to another. A virtual BMC stack 360 can get certain features, like cloning, at a very low cost.

In certain embodiments, the virtual BMC stack 360 runs as a part of a hypervisor 304 or on a hypervisor that runs on the CPU 108. One skilled in the art would appreciate that the hypervisor 304 can also run on two CPUs, four CPUs, eight CPUs, or any suitable number of CPUs. The hypervisor 304 can be of various types and designs, such as XEN, MICROSOFT HYPER-V, VMWARE ESX. The hypervisor 304 can emulate one or more virtual machines or domains 340, 350. An operating system 342, 352 can be installed in a virtual machine 340, 350. The operating system 342, 352 may not realize that it is running on virtual machine and may perceive that it is running on a physical machine. The operating systems 342, 352 running on the virtual machine 340, 350 can host one or more application programs. These operating systems 342, 352 are not necessary for the hypervisor 304 to run on the hardware 302 of the computer system 100 and can be considered as hosted by, or a guest of, the hypervisor 304.

In certain embodiments, the virtual BMC can be implemented by a virtual BMC stack 360 running as a part of the hypervisor 304. In certain embodiments, the virtual BMC can be implemented by a virtual BMC stack 460 running on a virtual machine 440 emulated by the hypervisor 304. An operating system 452, 462 of the computer system 100 runs on another virtual machine 450, 460 emulated by the hypervisor 304 and that is isolated from the virtual machine 440 running the virtual BMC 460. Regardless of running in a virtual machine or as part of the hypervisor 304, the virtual BMC 360, 460 and the operating system 342, 352, 452, 462 can be assigned with different MAC addresses and/or IP addresses. The remote computer uses the MAC address and/or the IP address assigned to the virtual BMC stack 360, 460 to send packets, messages, or commands to the virtual BMC stack 360, 460. In certain embodiments, running the virtual BMC in a virtual machine 440 provided by the hypervisor can preserve backward compatibility and interoperability with existing Intelligent Platform Management Interface (IPMI)-based management software. In certain embodiments, a management application 344 running on the operating system 342 hosted by the hypervisor 304 or running on a remote client computer 370 perceives the virtual BMC as a physical system-on-chip BMC or conventional BMC. The existing management software 376 or tools on the remote client computer 370 will work well with the virtual BMC and does not distinguish the virtual BMC from a physical system-on-chip BMC or conventional BMC.

In certain embodiments, the chipsets (not shown) on the motherboard 102 of the computer system 100 can be in communication with a management bus 130 of the host computer system 100 and can provide information regarding the computer system's health, operating, and performance conditions, such as rudimentary information about the CPU voltage and temperature, to the virtual BMC. The chipsets can be in communication with sensors measuring the computer system's health, operating and performance-related parameters through, for example, the management bus 130. In these circumstances, the virtual BMC does not necessarily need the assistance of the virtual BMC component chip 104 (will be discussed in greater detail below) to gather the information. The virtual BMC can be implemented alone by the virtual BMC stack 360 running on a virtual machine or as part of the hypervisor 304. For example, the virtual BMC stack 360, utilizing components such as the CPU 108 and the chipsets, can alone monitor the CPU temperature and voltage and/or a single thermal zone.

In certain embodiments, the virtual BMC can provide advanced monitoring features and more detailed hardware information (such as temperatures in different thermal zones). The virtual BMC, in addition to the virtual BMC stack 360 running on a virtual machine or as part of the hypervisor, includes the virtual BMC component chip 104. For example, the virtual BMC component chip 104 can be communicatively coupled by way of the system bus 112 to the CPU 108. The virtual BMC component chip 104 can be communicatively coupled by way of the management bus 130 to a CPU temperature sensor 109 and the CPU fan 106 to provide monitoring functionality over the temperature sensor 109 and control functionality over the CPU fan 106.

In general, the virtual BMC monitors operation of the computer system 100. In certain embodiments, the virtual BMC monitors health-related aspects associated with the computer system 100, such as, but not limited to, the temperature of one or more components of the computer system 100, speed of rotational components (e.g., spindle motor, CPU Fan, etc.) within the system, the voltage across or applied to one or more components within the system 100, and the available or used capacity of memory devices within the system 100. To accomplish these monitoring functions, the virtual BMC (e.g., through the virtual BMC component chip 104) is communicatively connected to one or more components by way of the management bus 130. In certain embodiments, these components include sensor devices for measuring various health, operating, and performance-related parameters within the computer system 100. The sensor devices may be either hardware or software based components configured or programmed to measure or detect one or more of the various operating and performance-related parameters. Like the system bus 112, the component that initiates communication on a bus is referred to a master and the component to which the communication is sent is referred to a slave. In certain embodiments, the virtual BMC component chip 104 functions as the master on the management bus 130 in most circumstances, but may also function as either a master or a slave in other circumstances. Each of the various components communicatively connected to the virtual BMC component chip 104 by way of the management bus 130 can be addressed using a slave address.

The management bus 130 is used by the virtual BMC component chip 104 to request and/or receive various health, operating, and performance-related parameters from one or more components, which can be also communicatively connected to the management bus 130. In the embodiment of FIG. 1, the management bus 130 communicatively connects the virtual BMC component chip 104 to the CPU temperature sensor 109 and the CPU fan 106, thereby providing a means for the virtual BMC to monitor and/or control operation of these components. As with the system bus 112, the management bus 130 may include components other than those explicitly shown in FIG. 1. Exemplary components not shown in FIG. 1 may include, without limitation, tachometers, heat sensors, voltage meters, amp meters, and digital and analog sensors. In certain embodiments, the management bus 130 is an I²C® bus, which is manufactured by Phillips Semiconductors® and described in detail in the I²C® bus Specification, version 2.1 (January 2000).

In certain embodiments, the virtual BMC stack 360 running on a virtual machine or as part of the hypervisor 104 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated herein by reference.

The virtual BMC monitors health, operating and performance-related parameters received from various components of the computer system 100 in order to determine whether an "event" is occurring within the system 100. In an embodiment, these components can be either directly or indirectly connected to the baseboard 102. For example, with respect to the configuration shown in FIG. 1, the virtual BMC monitors operation of the CPU 108 (by way of the CPU temperature sensor 109) and the CPU fan 106 to determine whether certain operating or performance related parameters exceed or fall below prescribed threshold ranges of operation. An example of such an event may be the temperature reading of heat dissipated by the CPU 108 reaching in excess of 145 degrees Fahrenheit.

In accordance with certain embodiments of the disclosure, the virtual BMC may also control one or more components of the computer system 100 in response to the occurrence of an event. Referring back to the example above, the virtual BMC may initiate operation of the CPU fan 106 upon determining that the temperature dissipated by the CPU 108 has reached 146 degrees Fahrenheit. In addition, the virtual BMC stack 360 on the CPU 108 may also be connected to and receive sensed information from components connected by way of the system bus 112. The virtual BMC component chip 104 can be connected to and receive sensed information from components connected directly to a contact pin 204 (FIG. 2) of the virtual BMC component chip 104 or indirectly by way of a bus (e.g., the system bus 112) other than the management bus 130.

The Input/Output module 110 is used as a communication medium between any number and type of peripheral devices and the system bus 112. Communications destined for the CPU 108, the virtual BMC or any other component coupled to the system bus 112 and issued by a peripheral device must therefore pass through the Input/Output module 110 to the system bus 112 and then to the necessary component. Exemplary peripheral devices are shown in FIG. 1 and described below.

In the embodiment of FIG. 1, the Input/Output module 110 is connected to a user input module 116, e.g., a keyboard, a display unit 114 and one or more program storage devices, such as, without limitation, the disk storage unit 118 and the disk drive unit 119. The user input module 116 is shown as a keyboard, but may also be any other type of apparatus (e.g., joystick, mouse, etc.) for inputting commands into the CPU 108 or the virtual BMC. In accordance with one embodiment, the disk drive unit 119 is a CD-ROM driver unit capable of reading the CD-ROM medium 120, which typically contains programs and data.

In accordance with an alternative embodiment, the disk drive unit 119 may be replaced or supplemented by a floppy drive unit, a tape drive unit, or other storage medium drive unit. A network controller 122 is capable of connecting the computing system 100 to a network of remote computers via a network link 124. Examples of such systems include SPARC systems offered by Sun Microsystems, Inc., personal computers offered by IBM Corporation and by other manufacturers of IBM-compatible personal computers, and other systems running a UNIX-based or other operating system. A remote computer 370 may be a desktop computer, a server, a router, a network PC (personal computer), a peer device or other common network node, and typically includes many or all of the elements described above relative to the computing system 100. Logical connections may include a local area network (LAN) or a wide area network (WAN). Such networking environments are commonplace in offices, enterprise-wide computer networks, intranets, and the Internet.

In accordance with yet another embodiment, the computing system 100 further comprises an operating system 342, 352 running in a virtual machine 340, 350 of the hypervisor 304 and usually one or more application programs. The operating system 342, 352 comprises a set of programs that control, through the underlying virtual machine 340, 350, operations of the computer system 100 and allocation of resources. The set of programs, inclusive of certain utility programs, also provide a graphical user interface to the user. An application program is software that runs on top of the operating system software and uses computer resources made available through the operating system to perform application specific tasks desired by the user. In certain embodiments, the operating system employs a graphical user interface wherein the display output of an application program is presented in a rectangular area on the screen of the display device 114. The operating system is operable to multitask, i.e., execute computing tasks in multiple threads, and thus may be any of the following: Microsoft Corporation's WINDOWS operating systems, IBM's OS/2 WARP, Apple's MACINTOSH OSX operating system, LINUX, UNIX, etc.

Figure 2:
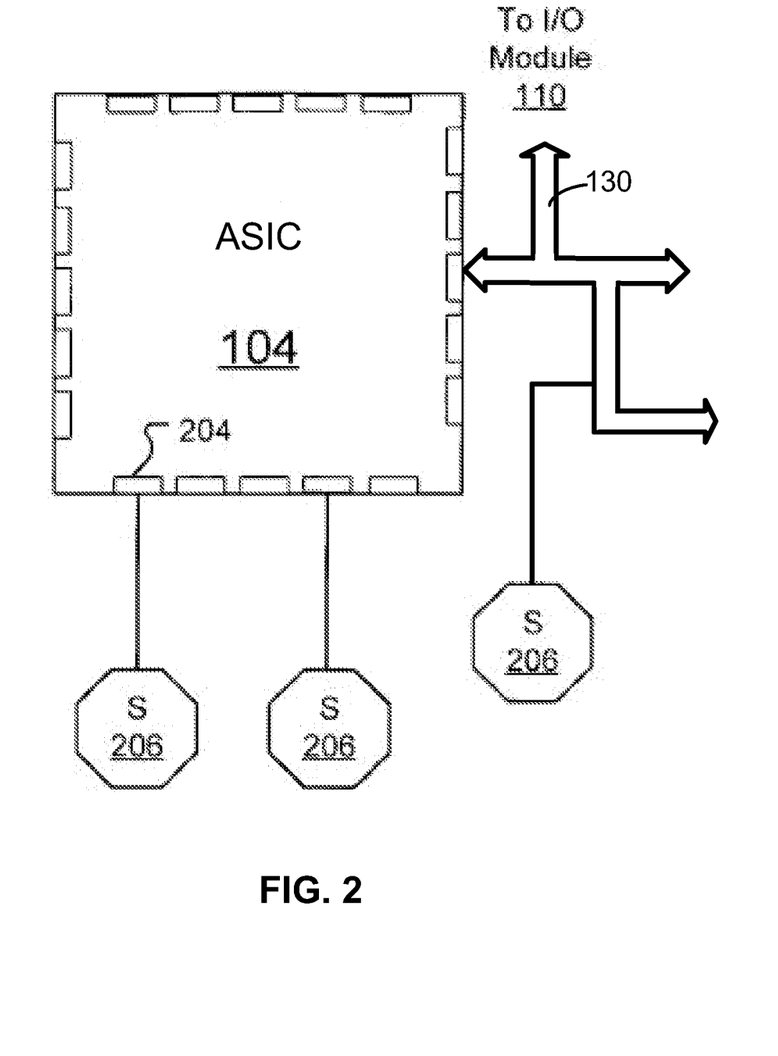
FIG. 2 schematically depicts a virtual BMC component chip in accordance with certain embodiments of the present disclosure.

As shown in FIG. 2, sensor devices 206 are connected to, and therefore communicate with, the virtual BMC component chip 104 by way of contact pins 204 located on the virtual BMC component chip 104. The sensor devices 206 may be connected to the contact pins 204 either directly or by way of the management bus 130. Regardless of the implementation, the functionality of these sensor devices 206 in this example is the same: the sensors 206 sense or measure information and subsequently transmit this information to the virtual BMC component chip 104. The virtual BMC component chip 104 communicates the sensed information to the virtual BMC stack 360. The virtual BMC stack 360 then analyzes the information sensed by these sensors and can either (1) issue an alert that an event is occurring; and/or (2) control operation of one or more components within the computer system based on the determination that an event is taking place.

While the sensors 206 are described in general terms when describing FIG. 2, it should be appreciated that these sensors 206 may be digital or analog sensors that sense any type of information. For example, the sensors 206 may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 206 may be implemented as a software/ firmware routine that senses information related to events associated with operation of either firmware or software modules implemented on the computer system 100. One such sensor 206 may be a software routine for detecting whether a particular software application program is "locked up," and therefore not operating properly.

Referring to FIG. 3, in certain embodiments, a hypervisor 304 is running on the computer system 100. Stated in a simplified way, the hypervisor 304 runs on top of the hardware including the CPU 108 and the physical memory 107. In certain embodiments, the hypervisor 304 can be stored or pre-built in a flash ROM of the computer system 100. Alternatively, the hypervisor can be stored or pre-built in the hard drive of the computer system 100. The hypervisor provides, among other thing, virtual CPUs 308, virtual memories 312, and scheduling services 316 to the virtual machines or guests (such as hosted operating systems 342, 352) installed on top of the hypervisor 304. The hypervisor 304 runs guests in environments in virtual machines or domains 330, 340, 350, which encapsulate a complete running virtual environment. The hypervisor 304 typically runs a domain or virtual machine 330 having higher security privilege, which is sometimes referred to as a privileged domain 330, and, optionally, one or more domains 340, 350 having lower security privilege, which are sometimes referred to as unprivileged domains 340, 350. In certain embodiments, a guest running in the privileged domain 330 typically can have access to hardware such as physical devices of the computer system and their drivers, while guests running in the unprivileged domains 340, 350 typically cannot.

In the example shown in FIG. 3, the hypervisor 304 provides a privileged domain 330. The hypervisor 304 itself may not include any device drivers, nor a user interface. These are all provided by the system and userspace tools running in the privileged domain 330 as guests. The privileged domain guest can be, but not necessarily is, operating systems such as WINDOWS, LINUX, NETBSD, and SOLARIS. Common tasks performed by the privileged domain guest are to handle devices. This guest runs at a higher level of privilege than others, and can access the hardware. For this reason, it is vital that the privileged guest be properly secured. In certain embodiments, the hypervisor 304 does not necessarily rely on a privileged domain guest to provide those functions. The hypervisor itself can provide those functions such as device drivers.

In certain embodiments, the virtual BMC stack 360 is running in the privileged domain 330 of the hypervisor 304 or as part of the hypervisor 304. Further, the remote computer 121 includes a World Wide Web (Web) browser 202, such as the INTERNET EXPLORER Web browser from MICROSOFT CORPORATION of Redmond, Wash., that enables the remote computer 370 to communicate over the network 306 with the virtual BMC. It should be appreciated that the computer system 100, as illustrated in FIG. 1, can be a server computer in a server farm and the remote computer 370 may similarly communicate over the network 105 with other server computers in the server farm.

The computer system 100 includes the network controller 122. In certain embodiments where the hypervisor 304 utilizes a privileged domain 330, the privileged domain 330 runs a network interface 374 that is communicative with the network controller 122. In certain embodiments, the network interface 374 can be part of the hypervisor 304. A MAC address 372 can be assigned to the virtual BMC. The network controller 122 can also include a network program for processing network communications sent to and from the network controller 122. The network program forwards network packets sent from the remote computer 370 addressed to the MAC address 211 to the network interface 374 running in the privileged domain or as part of the hypervisor 304 via the system bus 112.

In certain embodiments, the virtual BMC stack 360 further includes a TCP/IP stack 370, a Web server application program 366, in addition to the MAC address 372 that identifies the network interface 374 as the destination of network packets addressed to the MAC address 372. The virtual BMC stack 360 is in communication with the network interface 374. Thus, by executing the Web server application program 366 and the TCP/IP stack 370, and programming the network controller 122 to forward network packets addressed to the MAC address 372, the virtual BMC stack 360 can receive and respond to requests for management information via a Web interface. Further, because the network interface 374 has been allocated a MAC address 372, an IP address 368 may also be allocated to the network interface 374. The IP address 368 identifies network interface 374, and consequently the virtual BMC stack 360, on the TCP/IP network so that network packets may be routed to and from the virtual BMC stack 360 using the IP address 368. The IP address 368 may also be allocated a domain name that may be utilized in a URL to identify one or more Web pages available from the Web server application program 366.

The virtual BMC stack 360 also includes a management program 362. The management program 362 monitors, analyzes, and communicates directly, or through the virtual BMC component chip 104, measured health, operating and performance-related parameters within the computer system 100 sensed via the sensors 206. The sensors 206 measure or sense health, operating, and performance-related parameters associated with the computer system 100. In certain embodiments, the virtual BMC component chip 104 receives this information sensed by the sensors 206 and provides this information to the virtual BMC stack 360, for example via the system bus 112 or the management bus 130, for analysis, and more particularly, for determination on whether an event is occurring within the computer system 100. In certain embodiments, the BMC component chip 104 is in communication with a first temperature sensor and a second temperature sensor through the management bus 130. The first temperature sensor measures a first temperature in a first thermal zone of the computer system 100, and the second temperature sensor measures a second temperature in a second thermal zone of the computer system 100. The BMC component chip 104 collects the first and second temperatures and forwards the first and second temperatures to the virtual BMC stack 360.

The virtual BMC component chip 104 shown in FIG. 2 can be an ASIC device, but may be any type of hardware and/or software component capable of receiving sensed information and managing the delivery of this information to the virtual BMC stack 360. Alternatively, the virtual BMC component chip 104 may be operable to not only collect and forward sensed information, but also to analyze the sensed information to render advice on the parameters being monitored by the sensors 206. In certain embodiments, the virtual BMC component chip 104 may be programmed with firmware operable for processing the service information such as parameters received from the sensors 206 and sending the processed results to the virtual BMC stack 360. Even further, the virtual BMC component chip 104 may be programmed with firmware operable for performing sensing and measuring functions substantially similar to those functions performed by the sensors 206. The virtual BMC stack 360 then analyzes the information sensed by the sensors 206 and either (1) issues an alert that an event is occurring; and/or (2) controls operation of one or more components within the computer system based on the determination that an event is taking place. In certain embodiments, the BMC component chip 104 itself is not a full-fledged BMC or service processor and does not independently or substantially provide baseboard management functions. The virtual BMC component chip 104 does not have a full BMC software stack on it.

While the sensors 206 are described in general terms, it should be appreciated that these sensors 206 may be digital or analog sensors that sense any type of information. For example, the sensors 206 may sense, without limitation, temperature of a component (e.g., CPU 108) of the computer system 100, temperature within the chassis of the computer system 100, a voltage and/or current reading associated with a component of the computer system 100, or velocity and/or acceleration of a component (e.g., spindle motor, etc.) of the computer system 100. It is also contemplated that the sensors 206 may be implemented as a software/firmware routine that senses information related to events associated with operation of either firmware or software modules implemented on the computer system 100. One such sensor 206 may be a software routine for detecting whether a particular software application program is "locked up," and therefore not operating properly.

The sensed health, operating and performance-related parameters may be stored as data 364 in the virtual BMC stack 360 for subsequent retrieval and forwarding, for example via the implemented Web interface. For instance, the remote computer 370 may send a network packet to the virtual BMC stack 360 that makes an inquiry regarding a sensed parameter. In response, the virtual BMC stack 360 may retrieve the sensed parameter and forward the result to the remote computer 370 via the Web interface.

In certain embodiments, the virtual BMC stack 360 runs in the privileged domain or virtual machine 330 on the hypervisor 304 or as part of the hypervisor 304. The hypervisor 304 can further run one or more virtual machines or, for example, unprivileged domains 340, 350. A guest in a second virtual machine or unprivileged domain 340 can be an operating system such as MICROSOFT WINDOWS 342. The guest in a third virtual machine or unprivileged domain 350 can be a LINUX operating system 352. Other application programs can run on the operating systems 342, 352 hosted by the hypervisor 304.

As stated above, in certain embodiments, the virtual BMC stack 360 can be integrated with and running as part of the hypervisor 304 and the hypervisor 304 itself implements the functions (such as device drivers) otherwise provided by a guest (e.g. an operating system) running in the privileged domain 330. In certain system configurations, the motherboard 102 of the computer system 100 may not have a physical video controller. Nonetheless, the hypervisor 304 can provide a virtualized video controller to the operating systems or applications hosted by the hypervisor 304. The virtual BMC stack 360, configured as a part of the hypervisor 304, can provide redirection and the virtual media features without requiring a physical video controller.

In certain embodiments, the virtual BMC stack 360 provides functionality for remotely managing the operation of the managed host computer 100. Through the network 306, a remotely located management client computer 370 can establish a connection to the virtual BMC stack 360. The management client computer 370 includes an operating system 372 and a management client application 376 for communicating with and controlling the virtual BMC stack 360. The virtual BMC stack 360 provides a Web interface through which a Web browser application 374 executing on the management client computer 370 may access the functionality provided by the virtual BMC stack 360.

Through the use of the management client 376 or the Web browser 374, a remotely located user of the management client computer 370 can access information regarding the health and operation of the managed host computer 100. In this regard, as discussed above, the virtual BMC can monitor and manage environmental sensors 260 within the managed host computer 100. The virtual BMC also maintains appropriate connections to the managed host computer 100 to allow the virtual BMC stack 360 and/or the virtual BMC component chip 104 to monitor and control the power status of the managed host computer 100.

In certain embodiments, the virtual BMC stack 360 is also operative to redirect the text or video graphics output of the managed host computer 100 to the management client 376 or the Web browser 374. In this regard, the virtual BMC stack 360 may receive video display data generated by the hypervisor 304 utilizing a physical video controller or merely through a virtualized video controller as input, compress the video display data, and transmit the compressed data to the management client computer 370. The data is decompressed at the management client computer 370 and displayed. Additionally, keyboard and mouse input made at the management client computer 370 may be transmitted to the virtual BMC stack 360 and provided to the managed host computer 100 as if the input were generated locally. In this manner, a remotely located user of the management client computer 370 can control the operation of the managed host computer 100 as if they were proximately located. Appropriate connections between the virtual BMC stack 360 and the hypervisor 304 and/or an operating system 342, 352 running on the hypervisor 304 may be established for these purposes. For instance, the video display output of the operating system 342, 352 running on the hypervisor 304 may be provided to the virtual BMC stack 360. Similarly, the virtual BMC stack 360 may emulate one or more standard USB human interaction devices ("USB HIDs"), such as a keyboard and mouse, in order to provide remotely-generated keyboard and mouse data to the operating system 342, 352 running on the hypervisor 304.

In certain embodiments, the virtual BMC stack 360 may provide mass storage redirection facilities. In this regard, the virtual BMC stack 360 may emulate a USB mass storage device, such as a CD-ROM or DVD-ROM device. From the perspective of the operating system 342, 352 running on the hypervisor 304, a USB mass storage device is physically connected. However, utilizing functionality provided by the virtual BMC stack 360, the emulated mass storage device may be redirected to a physical mass storage device connected to the management client computer 370. In this manner, physical media present at the management client computer 370 appears to be physically present at the managed host computer 100. This functionality may be utilized to perform a remote operating system installation, repair, or upgrade, or to install other types of software on the managed host computer 100.

It should also be appreciated that the architecture of the virtual BMC shown in FIG. 3 has been simplified and that more or fewer hardware and software components may be utilized to provide the functionality described herein. The functionality described herein as being provided by the virtual BMC is also illustrative and the virtual BMC may provide more or fewer functions than those described herein.

Because the management client 376 and Web browser 374 can communicate with the virtual BMC stack 360 without passing through the operating systems hosted by, especially the operating systems 342, 352 running in the unprivileged domains 340, 350 of, the hypervisor 304, the communications channel between the virtual BMC stack 360 and the management client computer 370 can be referred to herein as being "out-of-band." Out-of-band communication is not handled by operating systems 342, 352 hosted by the hypervisor and for purpose of running application programs. Out-of-band management is useful for determining the health of the managed host computer 100 prior to an operating system 342, 352 being booted by the managed host computer 100 or when the operating system 342, 352 has crashed. Out-of-band management is also useful for configuring the operation of a basic input/output system ("BIOS") of the hypervisor 304.

It should be appreciated that the managed host computer 100 may also be managed through an "in-band" communications channel. In this regard, a management client application 376 running on the operating system 372 may establish a connection with the managed host computer 100. Through this in-band communications channel, communications may be made with one or more in-band management applications 344 executing on the operating system 342. Because the operating system 342 must be executing to enable communication with the in-band management applications 344, this type of management is referred to herein as "in-band" management. The in-band management applications 344 may include such management applications as the Systems Management Architecture for Server Hardware ("SMASH") and Web Services Management ("WS-MAN"). Other in-band management applications may be utilized in a similar manner.

In certain embodiments, the management client application 376 running on the remote computer 370 employs existing protocols such as IPMI to communicate with the virtual BMC stack 360. The management client application 376 can be originally designed for managing computer systems through BMC stacks running on service processors separate from the CPUs of the computer systems. As the management client application 376 will not realize that the virtual BMC are not a physical BMC, the management client application can work seamlessly with the virtual BMC.

Referring to FIG. 4, in certain embodiments, a second virtual BMC stack 460 can run in an unprivileged domain or a virtual machine 440 on the hypervisor 304. This configuration may be advantageous in that the virtual BMC stack 460 can be installed on the computer system 100 after the hypervisor 304 has been installed. For example, a manufacturer of the computer system 100 may only install the hypervisor 304, but does not provide a BMC for the computer system 100. An end user of the computer system 100 can, subsequently, install the virtual BMC 460 in a virtual machine 440 on the hypervisor 304. Similar to the first virtual BMC stack 360 that runs in the privileged domain 330 of, or as part of, the hypervisor 304, the second virtual BMC stack 460 can include a management program 462, data 464, a Web server 466, and IP address 468, a TCP/IP stack 470, a MAC address 472, and a network interface 474. The network interface 474 in the unprivileged domain 440 can be assigned the MAC address 472 and/or the IP address 468 that are different from those of the hypervisor 304, those of a privileged domain 430 of the hypervisor 304, and those of an operating system 452, 462 running in another unprivileged domain 450, 460 of the hypervisor 304. The virtual BMC stack 460 is isolated from the operating system 452, 462 of the computer system 100 and running on the hypervisor 304. A packet addressed to the virtual BMC stack 460 is initially received by the network controller 122 through the network 306 and then, through the operation of the hypervisor 304, forwarded to the virtual BMC stack 460.

In certain embodiments, the network interface 474 of the second virtual BMC stack 460 is not a typical network interface that directly communicates with the network controller 122. The network interface 474 in the second virtual BMC stack 460 can read packets from and writes packets to a segment of the virtual memory 312 of the hypervisor 304. A network interface module 432 in the privileged domain 430 or as part of the hypervisor 304 can also access that segment of the virtual memory 312. The network interface module 432 in the privileged domain 430 then communicates the packets in the segment to the physical network controller 122. For example, when a packet is sent by the management program 462 in the unprivileged domain 460, it travels through the TCP/IP stack 470 as it would normally. The bottom of the stack 460, however, is not a normal network interface driver. It can be a simple piece of code that puts the packet into some shared memory. The memory segment has been previously shared using the hypervisor's grant tables and has been advertised. The network interface module 432 in the privileged domain, or alternatively as part of the hypervisor 304, reads the packet from the shared segment, and inserts it into the firewalling components such as IP tables, which routes it as it would a packet coming from a real interface. In certain embodiments, the network interface module 432 in the privileged domain 430 or as part of the hypervisor 304 has a first network interface component that reads packets from and writes packets to the shared memory segment. The network interface module 432 also has a second network interface component (such as a real device driver) that communicates with the physical network interface controller 122 and transmits packets to and from the network interface controller 122. Once the packet has passed through any relevant firewalling rules, it makes its way down to the second network interface component of the network interface module 432 of the privileged domain. This is able to write to certain areas of memory reserved for I/O via the hypervisor 304. The physical network controller 122 then sends the packet.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computing system, comprising:
a host computer having a central processing unit (CPU);
a hypervisor configured to run on the CPU and to provide a first domain; and
a virtual baseboard management controller (BMC) stack configured to run in the first domain;
wherein the first domain is a privileged domain and includes a first network interface assigned a first MAC address, wherein the first MAC address functions as the MAC address of the hypervisor, wherein the virtual BMC stack is in communication with the first network interface and receives packets addressed to the first MAC address.

2. The computer system of claim 1, wherein the virtual BMC stack is configured to receive a first parameter relating to operation or performance or health of the computer system and measured by a first sensor.

3. The computer system of claim 2, wherein the first parameter is transmitted to the virtual BMC stack through a system bus of the computer system.

4. The computer system of claim 2, wherein the first parameter is a CPU temperature and is measured by a CPU temperature sensor.

5. The computer system of claim 1, wherein the hypervisor is further configured to provide a second domain, wherein an operating system of the computer system is configured to run in the second domain.

6. The computer system of claim 5, wherein the virtual BMC stack of the first domain is isolated from the operating system of the second domain.

7. The computer system of claim 1, wherein the first domain further includes a TCP/IP stack, wherein the first network interface is assigned a first IP address, wherein the first IP address functions as the IP address of the hypervisor, wherein the virtual BMC stack responds to Intelligent Platform Management Interface (IPMI) commands addressed to the first IP address.

8. The computer system of claim 5, wherein the hypervisor is configured to provide a virtualized video controller, wherein the virtual BMC stack redirects video graphics output of the operating system rendered by the virtualized video controller to a remote client computer.

9. A computing system, comprising:
a host computer having a central processing unit (CPU);
a hypervisor configured to run on the CPU and to provide a first domain; and
a virtual baseboard management controller (BMC) stack configured to run in the first domain;
wherein the first domain is an unprivileged domain and has a first network interface, wherein the first network interface writes a first packet received from the virtual BMC stack and addressed to a remote computer in a shared memory segment of the hypervisor, wherein the first network interface reads a second packet in the shared memory segment and addressed to the virtual BMC stack as well as sends the second packet to the virtual BMC stack.

10. The computer system of claim 9, wherein the hypervisor includes a second domain that is a privileged domain, wherein the second domain has a second network interface, wherein the second network interface reads the first packet written in the shared memory segment by the first network interface and forwards the first packet en route to the remote computer.

11. The computer system of claim 1, further comprising a BMC component chip in communication through a management bus with a plurality of sensors each sensing a parameter relating to operation or performance or health of the computer system, wherein the BMC component chip transmits a plurality of sensed parameters to the virtual BMC stack through a system bus.

12. The computer system of claim 11, wherein the BMC component chip is not a full-fledged service processor and does not independently provide substantial baseboard management functions.

13. The computer system of claim 11, wherein the BMC component chip is in communication with a first temperature sensor and a second temperature sensor through a management bus, wherein the first temperature sensor measures a first temperature in a first thermal zone of the computer system, wherein the second temperature sensor measures a second temperature in a second thermal zone of the computer system, wherein the BMC component chip collects the first and second temperatures and forwards the first and second temperatures to the virtual BMC stack.

14. The computer system of claim 11, wherein the BMC component chip has firmware that processes the parameters received from the plurality of sensors and sends the processed results to the virtual BMC stack.

15. The computing system of claim 1, wherein the virtual BMC stack has a management host application, wherein the computer system further includes a remote client computer configured to run a management client application, wherein the management host application and the management client application are configured to communicate out-of-band.

16. A computer system, comprising:
a host computer having a central processing unit (CPU);
a hypervisor configured to run on the CPU and to provide a first domain; and
a virtual baseboard management controller (BMC) stack configured to run as a part of the hypervisor;
wherein the hypervisor includes a first network interface assigned a first MAC address, wherein the virtual BMC stack is in communication with the first network interface and receives packets addressed to the first MAC address.

17. The computer system of claim 16, wherein the virtual BMC stack is configured to receive a first parameter relating to operation or performance or health of the computer system and measured by a first sensor.

18. The computer system of claim 17, wherein the first parameter is transmitted to the CPU through a system bus of the computer system.

19. The computer system of claim 17, wherein the first parameter is a CPU temperature and is measured by a CPU temperature sensor.

20. The computer system of claim 16, wherein an operating system of the computer system is configured to run in the first domain.

21. The computer system of claim 16, wherein the hypervisor further includes a TCP/IP stack, wherein the first network interface is assigned a first IP address, wherein the virtual BMC stack responds to Intelligent Platform Management Interface (IPMI) command addressed to the first address.

22. The computer system of claim 16, further comprising a BMC component chip in communication through a management bus with a plurality of sensors each sensing a parameter relating to operation or performance or health of the computer system, wherein the BMC component chip transmits a plurality of sensed parameters to the virtual BMC stack through a system bus.

23. The computer system of claim 22, wherein the BMC component chip is not a full-fledged service processor and does not independently provide substantial baseboard management functions.

24. The computer system of claim 22, wherein the BMC component chip is in communication with a first temperature sensor and a second temperature sensor through a management bus, wherein the first temperature sensor measures a first temperature in a first thermal zone of the computer system, wherein the second temperature sensor measures a second temperature in a second thermal zone of the computer system, wherein the BMC component chip collects the first and second temperatures and forwards the first and second temperatures to the virtual BMC stack.

25. The computer system of claim 22, wherein the BMC component chip has firmware that processes the parameters received from the plurality of sensors and sends the processed results to the virtual BMC stack.

26. A non-transitory computer readable medium that stores instructions executable by at least one processor, the instructions, when executed by the processor, cause the processor to perform a method comprising:

loading a virtual baseboard management controller (BMC) stack in a first domain of, or as a part of, a hypervisor running on the processor;

wherein the first domain is a privileged domain and includes a first network interface assigned a first MAC address, wherein the first MAC address functions as the MAC address of the hypervisor, wherein the instructions include executing the virtual BMC stack to communication with the first network interface and to receive packets addressed to the first MAC address.

27. The non-transitory computer readable medium of claim 26, wherein the method further includes:
executing the virtual BMC stack to receive a first parameter relating to operation or performance or health of the computer system and measured by a first sensor.

28. The non-transitory computer readable medium of claim 27, wherein the first parameter is transmitted to the virtual BMC stack through a system bus of the computer system.

29. The non-transitory computer readable medium of claim 27, where in the first parameter is a CPU temperature and is measured by a CPU temperature sensor.

30. The non-transitory computer readable medium of claim 26, wherein the method further includes loading an operating system in a second domain of the hypervisor, wherein the virtual BMC stack is loaded in the first domain.

31. The non-transitory computer readable medium of claim 30, wherein the virtual BMC stack of the first domain is isolated from the operating system of the second domain.

32. The non-transitory computer readable medium of claim 26, wherein the first domain further includes a TCP/IP stack, wherein the first network interface is assigned a first IP address, wherein the first IP address functions as the IP address of the hypervisor, wherein the instructions include executing the virtual BMC stack to respond to Intelligent Platform Management Interface (IPMI) commands addressed to the first IP address.

33. The non-transitory computer readable medium of claim 30, wherein the hypervisor is configured to provide a virtualized video controller, wherein the method further includes executing the virtual BMC stack to redirect video graphics output of the operating system rendered by the virtualized video controller to a remote client computer.

34. A non-transitory computer readable medium, that stores instructions executable by at least one processor, the instructions, when executed by the processor, cause the processor to perform a method comprising:
loading a virtual baseboard management controller (BMC) stack in a first domain of a hypervisor running on the processor;
wherein the first domain is an unprivileged domain and has a first network interface, wherein the first network interface writes a first packet received from the virtual BMC stack and addressed to a remote computer in a shared memory segment of the hypervisor, wherein the first network interface reads a second packet in the shared memory segment and addressed to the virtual BMC stack as well as sends the second packet to the virtual BMC stack.

35. The non-transitory computer readable medium of claim 34, wherein the hypervisor includes a second domain that is a privileged domain, wherein the second domain has a second network interface, wherein the second network interface reads the first packet written in the shared memory segment by the first network interface and forwards the first packet en route to the remote computer.

36. The non-transitory computer readable medium of claim 26, wherein the method further includes executing the virtual BMC stack to receive a plurality of sensed parameters from a BMC component chip through a system bus, wherein the BMC component chip is in communication through a management bus with a plurality of sensors each sensing a parameter relating to operation or performance or health of the computer system.

37. The non-transitory computer readable medium of claim 36, wherein the BMC component chip is not a full-fledged service processor and does not independently provide substantial baseboard management functions.

38. The non-transitory computer readable medium of claim 36, wherein the BMC component chip is in communication with a first temperature sensor and a second temperature sensor through a management bus, wherein the first temperature sensor measures a first temperature in a first thermal zone of the computer system, wherein the second temperature sensor measures a second temperature in a second thermal zone of the computer system, wherein the BMC component chip collects the first and second temperatures, wherein the instructions include executing the virtual BMC stack to receive the first and second temperatures.

39. The non-transitory computer readable medium of claim 36, wherein the BMC component chip has firmware that processes the parameters received from the plurality of sensors, wherein the instructions include executing the virtual BMC stack to receive the processed results.

40. The non-transitory computer readable medium of claim 26, wherein the virtual BMC stack has a management host application, wherein the method further includes executing the management host application to communicate, out-of-band, with a management client application on a remote client computer.

41. The computing system of claim 9, wherein the virtual BMC stack has a management host application, wherein the computer system further includes a remote client computer configured to run a management client application, wherein the management host application and the management client application are configured to communicate out-of-band.

42. The non-transitory computer readable medium of claim 34, wherein the virtual BMC stack has a management host application, wherein the method further includes executing the management host application to communicate, out-of-band, with a management client application on a remote client computer.

* * * * *